(12) United States Patent
Arndt et al.

(10) Patent No.: US 10,023,198 B2
(45) Date of Patent: Jul. 17, 2018

(54) METHOD FOR DETERMINING A RELATIVE GRADIENT OF A ROADWAY

(71) Applicant: FORD GLOBAL TECHNOLOGIES, LLC, Dearborn, MI (US)

(72) Inventors: Christoph Arndt, Moerlen (DE); Uwe Gussen, Huertgenwald (DE); Frederic Stefan, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/023,485

(22) PCT Filed: Oct. 7, 2014

(86) PCT No.: PCT/EP2014/071393
§ 371 (c)(1),
(2) Date: Mar. 21, 2016

(87) PCT Pub. No.: WO2015/052158
PCT Pub. Date: Apr. 16, 2015

(65) Prior Publication Data
US 2016/0214617 A1   Jul. 28, 2016

(30) Foreign Application Priority Data
Oct. 8, 2013  (DE) .................. 10 2013 220 303

(51) Int. Cl.
G06K 9/00     (2006.01)
B60W 40/076   (2012.01)
(Continued)

(52) U.S. Cl.
CPC ....... *B60W 40/076* (2013.01); *G06K 9/00798* (2013.01); *G06K 9/4633* (2013.01); *B60W 2050/006* (2013.01); *B60W 2420/42* (2013.01)

(58) Field of Classification Search
None
See application file for complete search history.

(56) References Cited

U.S. PATENT DOCUMENTS 5,892,855 A *  4/1999  Kakinami ............... G01S 11/12
                                             348/119
6,092,014 A *  7/2000  Okada .................... G01C 21/26
                                             340/438

(Continued)

FOREIGN PATENT DOCUMENTS

EP      2161677 A1    3/2010
WO    2013141226 A1   9/2013

OTHER PUBLICATIONS

International Search Report for PCT/EP2014/071393, dated Oct. 7, 2014, 11 pgs.

*Primary Examiner* — Shervin Nakhjavan
(74) *Attorney, Agent, or Firm* — Frank A. MacKenzie; Brooks Kushman P.C.

(57) ABSTRACT

A method for determining an incline in a road that is some distance ahead of a motor vehicle relative to the section of road that is currently being driven on by the motor vehicle, wherein images of the road that is ahead of the motor vehicle are recorded by a camera, road path lines are identified ahead of the motor vehicle in the recorded images and the relative incline is calculated with reference to the differences in the courses of the road path lines at different distances.

20 Claims, 3 Drawing Sheets

(51) Int. Cl.
   *G06K 9/46*         (2006.01)
   *B60W 50/00*        (2006.01)

(56) References Cited

U.S. PATENT DOCUMENTS

| | | | |
|---|---|---|---|
| 6,484,086 B2 | 11/2002 | Jeon | |
| 6,963,657 B1 * | 11/2005 | Nishigaki | G01S 11/12 |
| | | | 340/901 |
| 8,847,982 B2 * | 9/2014 | Kmiecik | G01C 11/02 |
| | | | 345/420 |
| 2002/0081001 A1 * | 6/2002 | Tsuji | G05D 1/0246 |
| | | | 382/104 |
| 2006/0161331 A1 | 7/2006 | Kumon et al. | |
| 2009/0103781 A1 | 4/2009 | Fleury et al. | |
| 2011/0006941 A1 * | 1/2011 | Samukawa | G01S 13/345 |
| | | | 342/70 |
| 2011/0098922 A1 * | 4/2011 | Ibrahim | B60W 40/08 |
| | | | 701/532 |
| 2017/0132480 A1 * | 5/2017 | Han | G06T 3/0062 |
| 2017/0151850 A1 * | 6/2017 | Deigmoller | B60G 17/0165 |

\* cited by examiner

METHOD FOR DETERMINING A RELATIVE GRADIENT OF A ROADWAY

CROSS-REFERENCE TO RELATED APPLICATION

This application is the National Stage of International Application No. PCT/EP2014/071393, filed Oct. 7, 2014, which claims priority to DE Patent Application No. 10 2013 220 303.9, filed Oct. 8, 2013, the disclosures of which are incorporated in their entirety by reference herein.

The invention relates to a method for determining the incline of a road that is some distance ahead of a motor vehicle relative to the section of road that is currently being driven on by the motor vehicle, wherein images of the road that is ahead of the motor vehicle are recorded by means of a camera, the road path lines ahead of the motor vehicle are identified in the images that are recorded and the relative incline is calculated with reference to differences in the courses of the road path lines at different distances, and the invention also relates to a device in accordance with the preambles of the independent claims for implementing the method.

In order to be able to fulfil current and future requirements for fuel consumption and pollution emission of motor vehicles having internal combustion engines or rather corresponding requirements for energy consumption of electric vehicles, a plurality of techniques are combined, including also determining relative and absolute road inclines in order to be able to tailor the driving strategy, such as for example the distance that is maintained by an adaptive cruise control with respect to a vehicle that is driving ahead, in advance to suit the road incline.

The knowledge of the relative road incline can also be used to automatically tailor other vehicle parameters—such as for example the alignment of the vehicle headlights—to suit the road ahead.

Road inclines can be obtained from map data using a navigation system, however map data that includes road inclines is not available for all roads and if said data is available, it is frequently not very accurate.

Alternative or complementary methods for determining relative road inclines can evaluate images of the road that is ahead of the motor vehicle, said images being recorded by a camera that is in or on the motor vehicle. A method of this type having the features of the preamble of claim 1 is disclosed in EP 2 051 206 B1. Said document only takes into account differences in the courses of the road markings at two different distances: once relatively near to the motor vehicle and once at as great a distance as possible from the motor vehicle. As a consequence, this method is very susceptible to error.

It is not very accurate to determine distances with reference to camera images in themselves. As an alternative or in addition thereto, it is also possible to determine distances using radar or lidar, there is however a considerable expenditure associated with this.

The object of the invention is to provide a robust and accurate method for determining a relative road incline and said method is to function only by evaluating camera images.

This object is achieved by means of a method and a device in accordance with the preambles of the independent claims.

Advantageous embodiments of the invention are disclosed in the dependent claims.

In accordance with the invention, the road path lines that are identified are interpolated in each case in their entirety in which said road path lines normally form straight or curved continuous lines or bends, said interpolation being performed in a non-linear manner with respect to a horizon of the road that is at some distance ahead of the motor vehicle. The distance between the horizon of the road ahead, said horizon being obtained in this manner, and a horizon of the road section that is currently being driven on is calculated and the relative incline is derived directly from the distance between two horizons.

In a preferred embodiment, the horizon of the section of road that is currently being driven on is established in that the road path lines are interpolated in a linear manner. This has the advantage that in this case, the distance of the two horizons from one another and therefore the relative incline is independent of the prevailing pitch of the motor vehicle.

The linear interpolation of the road path lines is preferably the identification of straight lines by means of the Hough transform technique or the Radon transform technique.

In an alternative to a horizon of the section of road that is currently being driven on being established by means of linear interpolation, a horizon that is established by means of the mounted position and calibration of the camera can also be used, where required after a correction taking into account the prevailing pitch of the motor vehicle and said pitch can be determined using sensors other than cameras and/or can be determined from map data in a vehicle navigation system.

The non-linear interpolation is preferably an approximation of a higher order in particular by means of the generalized Hough transform technique.

A distance between the horizon of the section of road that is currently being driven on, said horizon being obtained by means of non-linear interpolation, and a horizon that is established by means of the mounted position and calibration of the camera can be used in order to determine the prevailing pitch of the motor vehicle and/or in order to monitor or to improve the values that are delivered by the pitch sensors and/or longitudinal accelerometers in the motor vehicle.

The road path lines generally represent road markings, in particular markings of the road edges and/or lane markings such as for example center lines. If markings of this type are not present or in addition thereto, road path lines could also be obtained from other delimiting features such as for example crash barriers, curb stones etc.

The road path lines should essentially continuously reproduce the road path that can be identified in the camera images, at least up to the distance that is essentially limited by the resolution of the camera and the conspicuousness of the road markings.

The relative incline that is calculated in accordance with the method can then be used to tailor driving strategies, vehicle parameters and/or vehicle settings to suit the road incline.

The following is a description of exemplary embodiments with reference to the drawings. In the drawings.

Modern motor vehicles are more and more frequently being fitted with camera systems for supporting safety applications such as for example adaptive cruise controls, lane departure warning systems or other systems. The images that are recorded using these cameras are usually evaluated in order to provide defined data sets for specific applications.

For the present application, geometric features of the geometry of camera images of the scenery ahead of a motor vehicle are evaluated, in which a section of the road that is about to be driven on is located.

Figure 1:
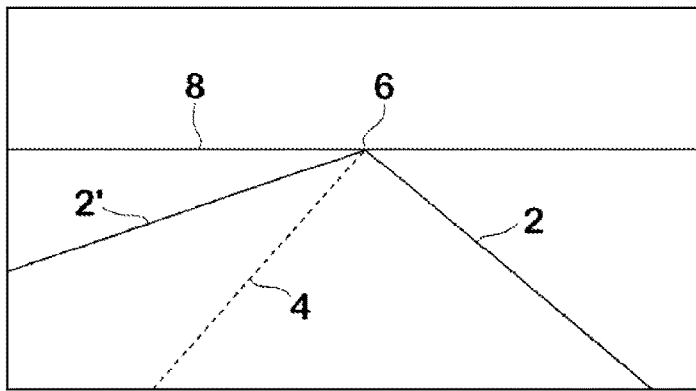
FIG. 1 illustrates a camera image of a straight road that is ahead of a motor vehicle on one plane.

As is illustrated in FIG. 1, a straight road on one plane is characterized typically by means of laterally solid road markings 2, 2' and a dashed center line 4 that intersect at a point 6 that lies on a horizontal line 8 that corresponds to the horizon in the real world in the case of a plane that is being driven on.

The position of the horizon line 8 in the camera image depends upon the optical path and on the mounted position of the camera. The horizontal line 8 is normally established after mounting the camera and then remains permanently fixed.

Figure 2:
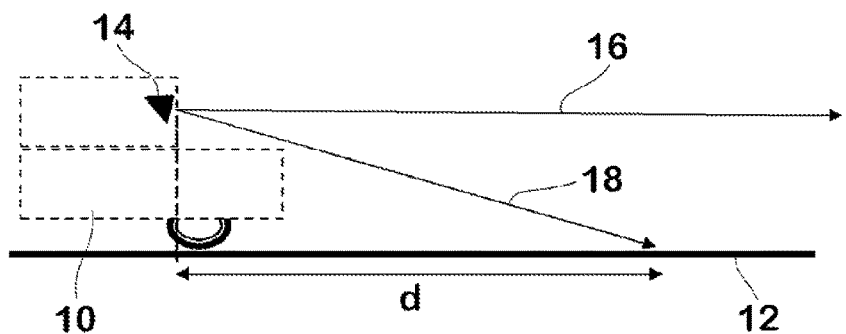
FIG. 2 illustrates the situation in FIG. 1 from the side.

The situation that is illustrated in FIG. 1 is illustrated in FIG. 2 from the side. A motor vehicle 10 drives on a straight road 12 on a plane from left to right in the figure. A camera 14 that is arranged for example behind the windshield of the motor vehicle 10 points in the direction of travel and observes the horizon of the road, for example the horizontal line 8 in FIG. 1 in a viewing direction 16 that extends essentially parallel to the road 12 in dependence upon the road path and how far this can be identified. The road 12 that is ahead of the motor vehicle 10 is located in the field of view of the camera 14, wherein a section of road that is at a final distance d ahead of the camera 14 is observed in a viewing direction 18 that is different from the viewing direction 16 in which the horizon is observed.

Figure 3:
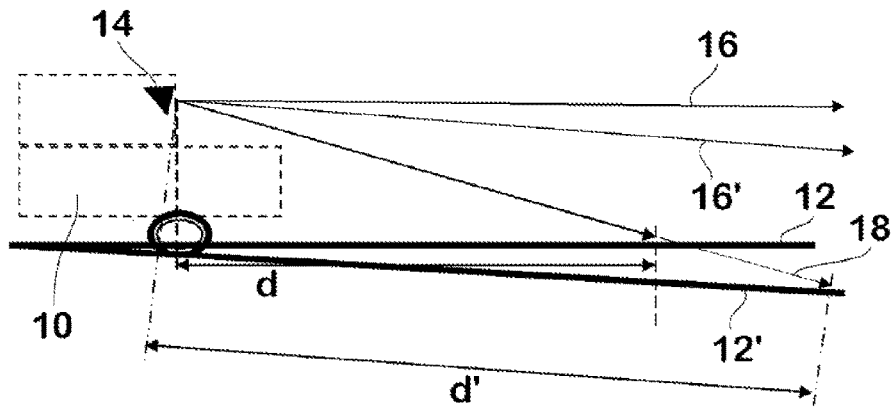
FIG. 3 illustrates a similar situation to that in FIG. 1 from the side if the road ahead of the motor vehicle comprises a gradient.

FIG. 3 illustrates a similar situation to that in FIG. 1 from the side if the road 12 directly below the motor vehicle 10 is still planar but comprises a constant gradient in the direction of travel, in other words extends along a gradient section 12'. In this case, the horizon of the gradient section 12' is below the horizon of the planar road 12 and is observed by the camera 14 in a viewing direction 16' that according to the value of the gradient is different from the viewing direction 16 in which the horizontal line 8 is seen. A road section is now located in the viewing direction 18 of the camera 14, said road section being at a distance d' ahead of the camera 14, said distance being greater than the distance d in FIG. 1.

In the case of an incline rather than a gradient, said gradient also being designated as a negative incline, the distance of a road section that is seen at the same pixel position of the image sensor of the camera 14 to be in the same pixel position would become smaller rather than larger.

It is necessary to differentiate between the above described horizon effect and the effects that relate to a pitch of the motor vehicle 10 that occur dynamically as a result of pitching movements or statically as a result of uneven loading.

Since all road path lines for example the road markings 2, 2' and the center line 4 in FIG. 1 intersect at a point, the horizon of the section of road that is observed by the camera 14 can be calculated from the camera image in that the road path lines starting from the image foreground are interpolated in a linear manner and a horizon is drawn through their intersecting point.

For this purpose, it is possible to identify a straight line by means of the Hough transform technique or Radon transform technique as is known per se from the prior art if the road path lines are provided as point groups such as in the case of digital camera images.

Figure 4:
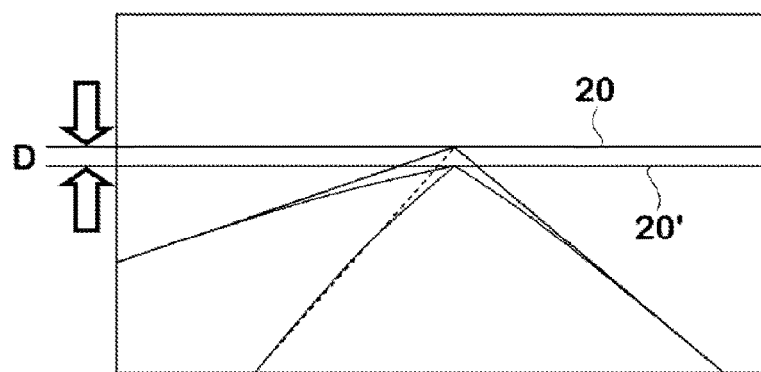
FIG. 4 illustrates the camera image of a straight road ahead of a motor vehicle with an increasing gradient in the direction of travel in comparison to the situation in FIG. 1.

In the case of a straight road on one plane, a horizon 20 that is obtained in this manner should correspond in FIG. 4 to the preset horizontal line 8 in FIG. 1. In each case, the horizon 20 and the horizontal line 8 are related to the section of road that is currently being driven on by the motor vehicle 10.

In the case of a straight road having an increasing gradient in the direction of travel, the road path lines extend in an ever decreasing straight manner with increasing distance from the camera 14, but rather said road path lines curve increasingly as is illustrated in FIG. 4, and they intersect at a point that lies on a horizon 20' that extends in a distance D below the horizon 20.

Also in this case, linear interpolation or rather the identification of a straight line provides the horizon 20 in FIG. 3 because the sections of the road path lines that are closer to the camera 14 are almost straight and are interpolated starting from the image foreground.

The horizon 20' at which the increasingly curved road path lines converge is related to a section of road that is some distance ahead of the motor vehicle 10, namely to a section of road that is still within the range of identification that is limited essentially by means of the resolution of the camera 14 and the conspicuousness of the road longitudinal markings. This range is typically some 10 meters, for example 20 meters.

The point at which the increasingly curved road path lines converge and consequently the horizon 20' can be determined by means of non-linear interpolation of the curved road path lines, for example by means of the generalized Hough transform technique at the point groups that represent the road path lines.

The distance D between the two horizons 20 and 20' in FIG. 4 represents the relative road incline, in other words the difference between the incline of the straight section of road that is being driven on and the incline of the section of road that is at some distance away.

In the same manner as is described above, the horizon 20' is also obtained in the case of a road that forms a curve as described hereinunder.

Figure 5A:
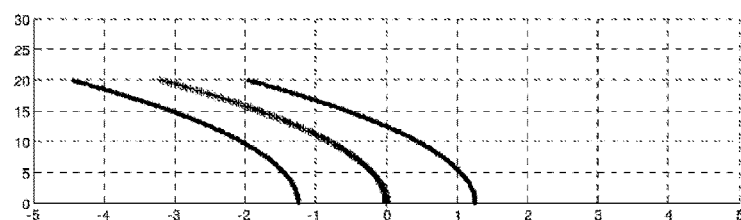
FIG. 5a illustrates an example for the road path lines of a left-hand curve ahead of the vehicle from a bird's-eye view.

FIG. 5a illustrates road path lines of an example for a curved road section ahead of the motor vehicle 10 from a bird's-eye view, wherein the x-coordinate corresponds to the distance of the road path lines or rather the point groups that represent these lines from the camera 14 in the direction of the width of the motor vehicle 10 and wherein the ordinate that is compressed by a factor of 10 with respect to the x-coordinate corresponds to the distance of the road path lines or rather the point groups that represent said road path lines from the camera 14 in the direction of travel.

Figure 5B:
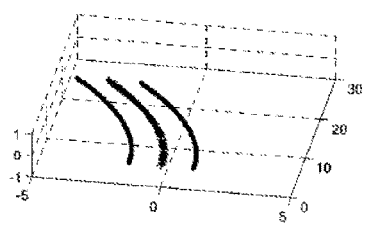
FIG. 5b illustrates a three-dimensional illustration of the road path lines in FIG. 5a if the left-hand curve extends in the same plane as the section of road beneath the motor vehicle.
Figure 5C:
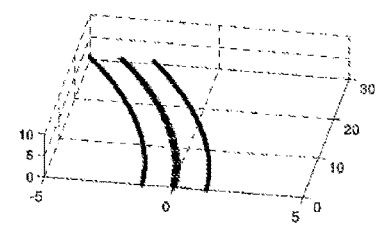
FIG. 5c illustrates a three dimensional illustration of the road path lines in FIG. 5a if the left-hand curve inclines with an upward slope relative to the motor vehicle.

FIG. 5b is a three-dimensional illustration of the road path lines in FIG. 5a in the case that the road section is a left-hand curve that is on the same plane as the section of road that is currently being driven on by the motor vehicle 10, while FIG. 5c is a three-dimensional illustration of the road path lines in FIG. 5a in the case that the section of road is not only curved to the left-hand side but rather also inclines constantly relative to the section of road that is before it, in other words that the motor vehicle 10 is located directly at the start of an incline of the left-hand curve.

Figure 5D:
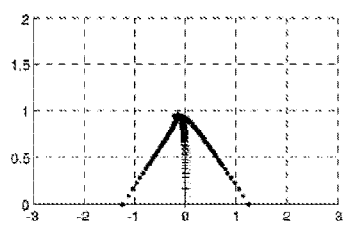
FIG. 5d illustrates a schematic camera image of the road path lines in FIG. 5b.
Figure 5E:
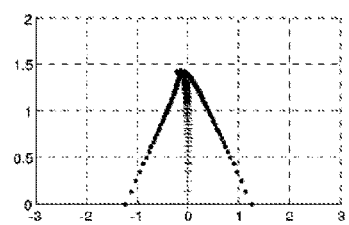
FIG. 5e illustrates a schematic camera image of the road path lines in FIG. 5c.

FIG. 5d illustrates the road path lines of 5b from the view of the camera 14 and FIG. 5e illustrates the road path lines of FIG. 5c from the view of the camera 14.

In FIGS. 5d and 5e, the ordinate value 1 represents the horizon that is provided by means of the mounted position and calibration of the camera 14, said horizon corresponding to the horizontal line 8 in FIG. 1 or rather the horizons 20 in FIG. 3.

It is evident that if in FIGS. 5d and 5e the road path lines are not interpolated in a non-linear manner, said road path lines converge in FIG. 5d at a point that lies on the preset horizon such as to be expected in the case of a road that is on a plane. However, the road path lines in FIG. 5e converge at a point that lies on a horizontal line through the ordinate value 1.5.

The relative incline of the road curve as seen in FIG. 5e by the camera 14 in relation to the preset horizon is determined directly from the camera image. And indeed, the relative incline is=(ordinate value of the non-linear interpolated horizon−ordinate value of the preset horizon)/ordinate value of the preset horizon×100%=(1.5−1)1×100%=50%.

It is noted that the relative incline that is obtained in this manner does not depend upon any distances that are difficult to determine or that are only determined in a very inaccurate manner from the camera images but rather only by the camera geometry. The distance between the horizon of the road section that is currently being driven on by the motor vehicle 10 and the horizon of the road that is some distance ahead of the motor vehicle 10, said latter horizon being obtained by means of non-linear interpolation of the road path lines, is a linear measure for the relative incline in the real world.

While in the example in FIG. 4, the horizon of the road section that is currently being driven on by the motor vehicle 10 would be obtained by means of linear interpolation of the road path lines, in the example in FIG. 5e, the horizon that is present by means of the mounted position and calibration of the camera 14 would be used to calculate the relative incline. Any of the two methods can be used, wherein however the first is preferred.

In the case of calculating the horizon by means of linear interpolation, it is however to be noted that this in each case possibly does not precisely provide the incline of the road section that is currently being driven on by the motor vehicle. For example, if in the example of FIG. 5e the road path lines were interpolated in a linear manner as in the example in FIG. 4, an incorrect value of the relative incline would be obtained. This resides in the fact that the FIGS. 5c and 5e illustrate a case that is lacking practical relevance, wherein the road directly ahead of the motor vehicle 10 abruptly goes into an extreme incline. A soft transition to a realistic incline would also lead to a linear interpolation of the road path lines to the correct horizon of the section of road that is currently being driven on by the motor vehicle 10 and therefore to the correct relative incline. In addition, in cases such as those in FIGS. 5c and 5e, the horizon of the section of road that is currently being driven on by the motor vehicle 10 is then in any case correctly identified shortly before the motor vehicle 10 reaches the position that corresponds to the FIGS. 5c and 5e.

Figure 6:
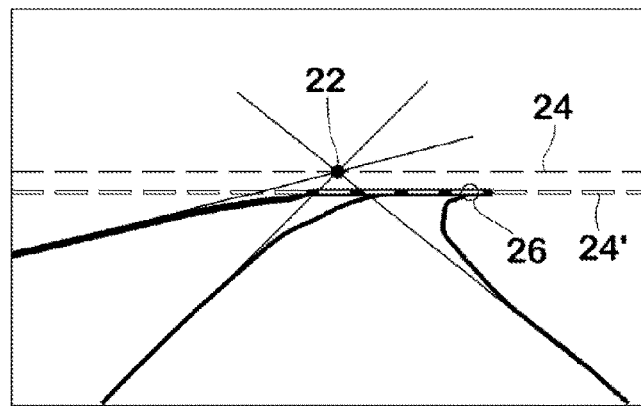
FIG. 6 illustrates an example for road path lines of a right-hand curve ahead of the motor vehicle, said right-hand curve comprising an increasing gradient.

FIG. 6 illustrates a further example for calculating two horizons by means of linear or rather non-linear interpolation of the road path lines, namely with reference to a right-hand curve that is ahead of the motor vehicle 10, said right-hand curve comprising an increasing gradient. If the road path lines that are illustrated in FIG. 6 as thick lines are interpolated in a linear manner, said road path lines intersect at a point 22 that lies on a horizon 24 that corresponds to the horizon of the section of road that is currently being driven on by the motor vehicle 10. If the road path lines that are illustrated as thick lines are interpolated in a non-linear manner, said road path lines intersect at a point 26 that lies on the horizon 24' that corresponds to the horizon of a section of road that is still detected by the camera 14 and is some distance ahead of a motor vehicle 10.

The relative incline is in this case=(ordinate value of the non-linear interpolated horizon 24'−ordinate value of the linear interpolated horizon 24)/ordinate value of the linear interpolated horizon 24. Specifically in this case, for example, a relative incline of −4% occurs which owing to the negative symbol is a gradient.

With the relative incline that is obtained in this manner, it is possible to tailor vehicle parameters to suit the upcoming road path. For example, preparation can be made or procedures started for recuperating current for the vehicle battery by means of regenerative braking, for selecting another gear, for increasing the distance that the adaptive cruise control is to maintain with respect to a vehicle travelling ahead etc.

Horizon calculations on the one hand by means of linear interpolation and on the other hand by means of non-linear interpolation of the road path lines in one and the same camera image have the advantage that the relative incline that is obtained in this manner is independent of the prevailing pitch of the motor vehicle 10 as a result of pitching movements or uneven loading.

On the other hand, the horizon that is preset by means of the mounted position and calibration of the camera 14 is displaced if the motor vehicle 10 pitches. This fact can be utilized in order also to determine the pitch of the motor vehicle 10 from the camera images within the scope of the above described method as is described hereinunder.

If the preset horizon is compared over a longer period of time or section of road with the horizon that is determined by means of linear interpolation of road path lines, a measure for the pitch of the motor vehicle 10 is thus obtained as a result of static loading.

Furthermore, if the preset horizon is compared for a longer period of time or sections of road with the horizon that is determined by means of linear interpolation of road path lines, a measure for the pitch of the motor vehicle 10 is thus obtained as a result of dynamic pitching movements.

This information regarding the pitch of the motor vehicle 10, said information being obtained from the camera images, can be used to make the measured values of a pitch sensor or longitudinal accelerometer in the vehicle more precise or in the absence of sensors of this type said information can be used directly by any devices in the motor vehicle that must detect the pitch.

Figure 7:
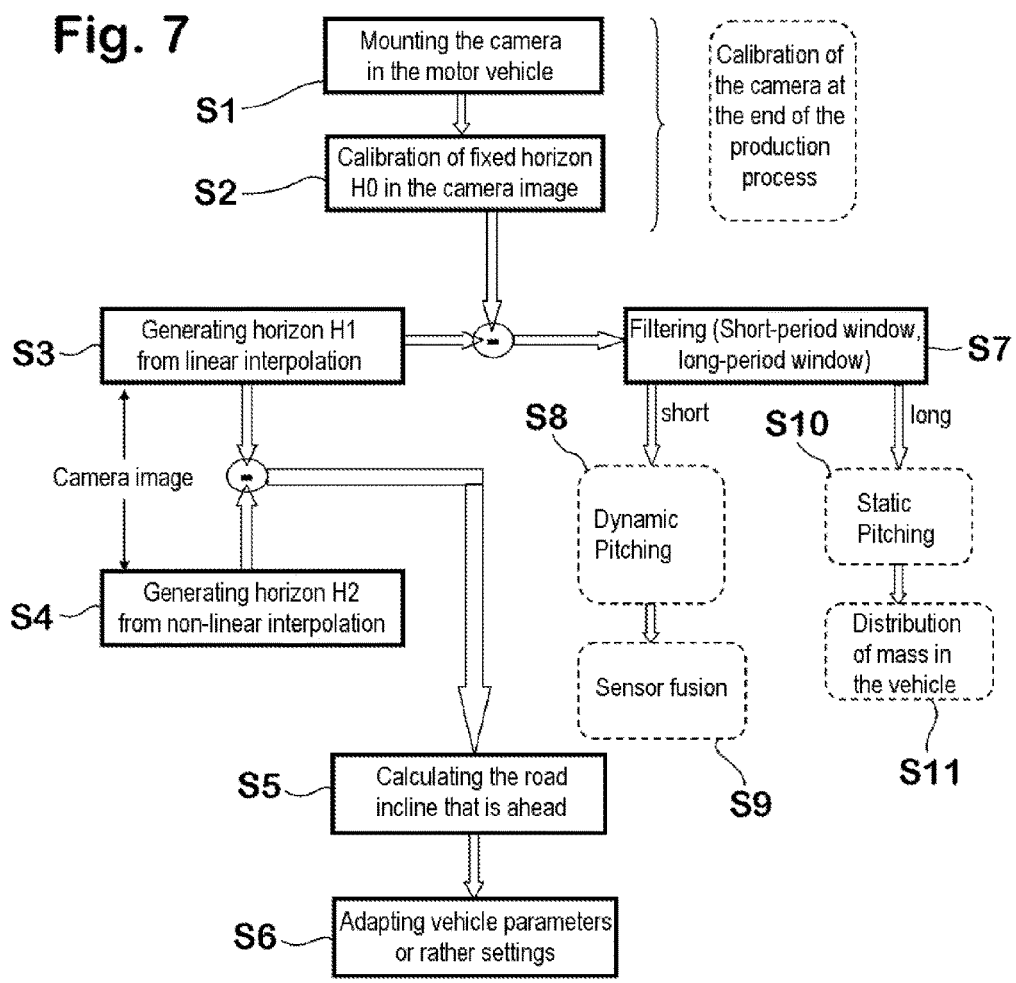
FIG. 7 illustrates a flow chart of an example for a method for determining a relative road incline.

FIG. 7 illustrates a flow chart of an example for a method for determining a relative road incline. Towards the end of the production process of a motor vehicle, a camera is mounted, by way of example behind the windshield (step S1) and a secure horizon H0 is calibrated (step S2).

Later, while the motor vehicle is driving, a horizon H1 is determined in step S3 by means of linear interpolation of the road path lines that are identified in a camera image, and a horizon H2 is determined in step S4 by means of non-linear interpolation of the road path lines as is described above.

In step S5, the incline of the road that is ahead of the motor vehicle in relation to the section of road that is currently being driven on by the motor vehicle is calculated from the distance of the two horizons H1 and H2 from one another. Optionally, the absolute incline of the road that is ahead can also be calculated if the absolute incline of the section of road that is currently being driven on is known for example from map data and/or any sensor fusion.

If a change in incline occurs in step S4, vehicle parameters or rather vehicle settings are adapted in step S6 as is described above.

In addition, the difference between the horizon H0 that is permanently calibrated in step S2 and the horizon H1 that is determined by means of linear interpolation of road path lines in step S3 can be short-period as well as also long-period filtered in step S7.

With reference to short-period differences of the two horizons H0 and H1, the dynamic pitch of the vehicle during maneuvers can be determined in step S8 and where necessary can be fused in step S9 with signals of a pitching sensor and/or longitudinal accelerometer.

With reference to long-period differences of the two horizons H0 and H1, the static pitch of the vehicle can be determined in step S10 as a result of the prevailing loading and the distribution of mass of the vehicle can be determined in step S11 from said static pitch.

The invention claimed is:

1. A method for determining an incline of a road ahead of a motor vehicle relative to a section of road that is currently being driven on by the motor vehicle, wherein images of the road ahead of the motor vehicle are captured by a camera, road path lines are identified in the images, and a relative incline is calculated with reference to differences in courses of the road path lines, wherein
the road path lines are interpolated in a non-linear manner to a first horizon of the road ahead of the motor vehicle, a distance between the first horizon and a second horizon of the section of road is calculated, and a relative incline is calculated from the distance of the first and second horizons from one another.

2. The method as claimed in claim 1, wherein the second horizon is derived from linearly interpolating the road path lines.

3. The method as claimed in claim 2, wherein linearly interpolating the road path lines includes an identification of a straight line via a Hough transform or Radon transform.

4. The method as claimed in claim 1, wherein the second horizon is derived from a mounted position and calibration of the camera.

5. The method as claimed in claim 1, wherein interpolating the road path lines in a non-linear manner includes use of a Hough transform.

6. The method as claimed in claim 1, wherein the distance is used to determine a prevailing pitch of the motor vehicle.

7. The method as claimed in claim 1, wherein the road path lines represent road markings.

8. The method as claimed in claim 1, wherein the road path lines at least partially reproduce the road that can be identified in the images.

9. A method comprising:
initiating, by a controller, regenerative braking procedures for a vehicle in response to a calculated distance, between a horizon derived from linearly interpolated road path lines associated with an image of a road the vehicle is travelling on and a horizon derived from non-linearly interpolated road path lines associated with the image, indicative of a decline of the road.

10. The method of claim 9, wherein the linearly interpolated road path lines are a pair of straight lines that intersect at the horizon derived from linearly interpolated road path lines.

11. The method of claim 9, wherein the non-linearly interpolated road path lines are a pair of curved lines that intersect at the horizon derived from the non-linearly interpolated road path lines.

12. The method of claim 9, wherein at least a portion of the linearly interpolated road path lines and the non-linearly interpolated road path lines represent road markings associated with the road.

13. The method of claim 12, wherein the road markings are road edges or lane demarcations.

14. The method of claim 12, wherein the first horizon is derived from a position of a camera on the vehicle configured to capture the image.

15. A method comprising:
increasing, by a controller, a following distance an adaptive cruise control is to maintain between a vehicle and another vehicle travelling ahead of the vehicle based on a calculated distance between a first horizon associated with a road the vehicle is travelling on and a second horizon derived from non-linearly interpolated road path lines associated with an image of the road.

16. The method of claim 15, wherein the first horizon is derived from linearly interpolated road path lines associated with the image.

17. The method of claim 16, wherein the linearly interpolated road path lines are a pair of straight lines that intersect at the first horizon.

18. The method of claim 15, wherein the non-linearly interpolated road path lines are a pair of curved lines that intersect at the second horizon.

19. The method of claim 16, wherein at least a portion of the linearly interpolated road path lines and the non-linearly interpolated road path lines represent road markings associated with the road.

20. The method of claim 19, wherein the road markings are road edges or lane demarcations.

* * * * *